United States Patent
Sun et al.

(10) Patent No.: US 10,200,095 B2
(45) Date of Patent: Feb. 5, 2019

(54) DATA TRANSMISSION METHOD, APPARATUS AND ANTENNA ARRAY

(71) Applicant: DATANG MOBILE COMMUNICATIONS EQUIPMENT CO., LTD., Beijing (CN)

(72) Inventors: Huarong Sun, Beijing (CN); Tao Duan, Beijing (CN); Suling Zou, Beijing (CN); Jinxi Su, Beijing (CN); Huijuan Ni, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 15/755,059

(22) PCT Filed: Jul. 21, 2016

(86) PCT No.: PCT/CN2016/090889
§ 371 (c)(1),
(2) Date: Feb. 23, 2018

(87) PCT Pub. No.: WO2017/032194
PCT Pub. Date: Mar. 2, 2017

(65) Prior Publication Data
US 2018/0248593 A1 Aug. 30, 2018

(30) Foreign Application Priority Data
Aug. 24, 2015 (CN) .......................... 2015 1 0524049

(51) Int. Cl.
*H04B 7/04* (2017.01)
*H04B 7/0452* (2017.01)
*H04B 1/00* (2006.01)

(52) U.S. Cl.
CPC ........... *H04B 7/0452* (2013.01); *H04B 1/001* (2013.01); *H04B 1/0007* (2013.01); *H04B 1/0021* (2013.01); *H04B 7/04* (2013.01)

(58) Field of Classification Search
CPC ...... H04B 7/0452; H04B 1/007; H04B 1/001; H04B 1/0021; H04B 7/04
See application file for complete search history.

(56) References Cited

U.S. PATENT DOCUMENTS

| 5,579,341 | A | 11/1996 | Smith et al. |
| 5,748,683 | A | 5/1998 | Smith et al. |

(Continued)

FOREIGN PATENT DOCUMENTS

| CN | 101790256 A | 7/2010 |
| CN | 102683897 A | 9/2012 |

(Continued)

OTHER PUBLICATIONS

State IP Office of the P.R. China—International Search Report of the International Searching Authority, with an English translation of the International Search Report, dated Oct. 24, 2016 for International Application No. PCT/CN2016/090889 (5 pgs).

(Continued)

*Primary Examiner* — Jaison Joseph
(74) *Attorney, Agent, or Firm* — Womble Bond Dickinson (US) LLP (57) ABSTRACT

Disclosed in the present invention are a data transmission method, an apparatus and an antenna array, in order to realize wide bandwidth data transmission of massive antenna array. The data transmission method comprises: baseband IQ data of multiple CA is grouped via IR data interface module to obtain baseband IQ data of each CA group; for baseband IQ data of each CA group: the baseband IQ data with enhanced data rate of the CA group is up- (Continued)

converted to digital intermediate frequency band by a digital up-conversion module; the digital intermediate frequency signals of the CA group are superposed by a combiner to form a multi-carrier digital intermediate frequency signal; in accordance with the amplitude and phase requirements of each antenna in a group of antenna sharing the multi-carrier digital intermediate frequency signal, the amplitude and phase of the multi-carrier digital intermediate frequency signal are respectively adjusted and transmitted to a digital to analog converter of a corresponding antenna channel; a multi-carrier analog intermediate frequency signal is generated by the digital to analog converter of each antenna channel, and then is transmitted to the corresponding antenna channel.

6 Claims, 7 Drawing Sheets

(56) References Cited

U.S. PATENT DOCUMENTS

| | | | | |
|---|---|---|---|---|
| 7,868,819 | B2* | 1/2011 | De Lorenzo | G01S 19/21 342/357.65 |
| 8,467,733 | B2* | 6/2013 | Leabman | H01Q 1/246 455/431 |
| 9,768,501 | B2* | 9/2017 | Maltsev | H01Q 3/36 |
| 10,050,695 | B1* | 8/2018 | Tsai | H04B 7/0897 |
| 10,069,547 | B2* | 9/2018 | Wang | H04B 7/0456 |
| 2007/0263748 | A1* | 11/2007 | Mesecher | H01Q 1/282 375/299 |
| 2009/0154427 | A1 | 6/2009 | Lee et al. | |

FOREIGN PATENT DOCUMENTS

| | | |
|---|---|---|
| CN | 103401072 A | 11/2013 |
| WO | WO 2015/022422 A1 | 2/2015 |

OTHER PUBLICATIONS

State IP Office of the P.R. China—Written Opinion of the International Searching Authority with an English translation dated Oct. 24, 2016 for International Application No. PCT/CN2016/090889 (3 pgs).

European Search Report for counterpart EP Application No. 16838454.3, 10 pgs. (dated Jun. 11, 2018).

PCT International Preliminary Report on Patentability for PCT Application No. PCT/CN2016/090889 with full English translation, 11 pgs. (dated Feb. 27, 2018).

* cited by examiner

DATA TRANSMISSION METHOD, APPARATUS AND ANTENNA ARRAY

CROSS-REFERENCE TO RELATED APPLICATIONS

This patent application is a U.S. National Phase application under 35 U.S.C. § 371 of International Application No. PCT/CN2016/090889, filed on Jul. 21, 2016, entitled DATA TRANSMISSION METHOD, APPARATUS AND ANTENNA ARRAY, which claims priority from and the benefit of Chinese Patent Application No. CN 20150524049.1, filed with the Chinese Patent Office on Aug. 24, 2015 and entitled "A Method and Apparatus for Transmitting Data, and an Antenna Array", the content of which was incorporated by reference in its entirety.

FIELD

The present disclosure relates to the field of communications, and particularly to methods and apparatuses for transferring data, and an antenna array.

BACKGROUND

Three-dimension (3D) multiple input multiple output (MIMO) can be implemented by using a large-scale antenna array to improve a utilization ratio of spectrum in a 5G mobile communication system. However, since a large-scale antenna array includes a large quantity of antennas and radio frequency channels, a data rate of an Interface Radio frequency (IR) interface between the active antenna array and a baseband unit (BBU) is very high. The data rate of the IR interface is also proportional to a supported bandwidth. It is difficult for a large-scale antenna array to support a large bandwidth due to limited interface data rate.

A large-scale antenna array needs to be used to implement 3D MIMO. A quantity of antennas in the large-scale antenna array is 2 to the power of N, generally at least 16, or as many as 128, 256, or more. The antennas compose a dually polarized antenna array and are arranged in M rows by P columns, where both M and P are exponents of 2. An antenna array in a vertical direction can perform beam scanning in the vertical direction, and an antenna array in a horizontal direction can perform beam scanning in the horizontal direction, to form a change in 3D beam scanning. A beam scanning range of antennas in the vertical direction (e.g., dually polarized antennas arranged in a row) is required to be narrow, whereas a beam scanning range of antennas in the horizontal direction (e.g., dually polarized antennas arranged in a column) is required to be wide. A sampling rate for a Long Term Evolution (LTE) signal with a 20 MHz bandwidth is 30.72 MSPS. For example, data of an IR interface is not compressed, and the transmission data rate of the IR interface as required for a carrier antenna (CA) is 1.2288 Gbps. Data of only eight CAs can be transmitted over an optic fiber of 10 Gbps. Taking 128 antennas as an example, 256 CAs are required to form 128 antennas of a total 40 MHz bandwidth, as a result, 32 optic fibers of 10G each are needed, and 80 optic fibers of 10G each are needed to support an 100M bandwidth, which is such a large quantity of optic fibers that may be infeasible.

Accordingly, two optic fibers of 10G each are configured for every eight antennas among existing technologies, and thus a bandwidth of only 40 MHz can be supported. It is difficult to provide a larger bandwidth, especially a bandwidth of 100 MHz required by the 5G system.

In summary, the small bandwidth of the conventional large-scale antenna array cannot meet the requirements of the future 5G system.

SUMMARY

An embodiment of the disclosure provides methods and apparatuses for transferring data, and an antenna array, to transfer data in a large bandwidth through a large-scale antenna array and meet the requirements of the future 5G system.

The embodiment of the disclosure provides a method for transmitting data. The method includes the following operations: dividing, by an IR data interface module, baseband in-phase and quadrature (IQ) data of multiple carrier antennas into groups to obtain baseband IQ data of each group of CAs; and for the baseband IQ data of each group of CAs: increasing, by an interpolation and filter module, a data rate of the baseband IQ data of the group of CAs; up-converting, by a digital up-conversion module, the baseband IQ data of the group of CAs having the increased data rate into a digital intermediate-frequency band to obtain digital intermediate-frequency signals of the group of CAs; adding, by a combiner, the digital intermediate-frequency signals of the group of CAs together to form a multi-carrier digital intermediate frequency signal; adjusting, by an amplitude and phase adjustment module, an amplitude and a phase of the multi-carrier digital intermediate-frequency signal as required by each antenna in a group of antennas sharing the multi-carrier digital intermediate-frequency signal, respectively, and then transmitting the adjusted multi-carrier digital intermediate-frequency signals to digital to analog converters of corresponding antenna channels; and generating, by the digital to analog converters of the corresponding antenna channels, multi-carrier analog intermediate-frequency signals, and transmitting the multi-carrier analog intermediate-frequency signals to the corresponding antenna channels.

By using this method, baseband IQ data of multiple carrier antennas is divided into groups to obtain baseband IQ data of each group of CAs by an IR data interface module. And for the baseband IQ data of each group of CAs: a data rate of the baseband IQ data of the group of CAs is increased by an interpolation and filter module; the baseband IQ data of the group of CAs having the increased data rate is up-converted by a digital up-conversion module into a digital intermediate-frequency band to obtain digital intermediate-frequency signals of the group of CAs; the digital intermediate-frequency signals of the group of CAs are added together by a combiner to form a multi-carrier digital intermediate-frequency signal; an amplitude and a phase of the multi-carrier digital intermediate-frequency signal are adjusted as required by each antenna in a group of antennas sharing the multi-carrier digital intermediate-frequency signal, respectively, and then the adjusted multi-carrier digital intermediate-frequency signals are transmitted to digital to analog converters of corresponding antenna channels; multi-carrier analog intermediate-frequency signals are generated by the digital to analog converters of the corresponding antenna channels, and the multi-carrier analog intermediate-frequency signals are transmitted to the corresponding antenna channels. In this way, data can be transmitted in a large bandwidth by a large-scale antenna array to meet the requirements of the future 5G system.

In an implementation, a quantity of antennas in the group of antennas is an exponent of 2.

In an implementation, the amplitudes and the phases required by the antennas are obtained from a baseband unit (BBU).

The embodiment of the disclosure further provides a method for receiving data. The method includes the following operations: for a multi-carrier analog intermediate-frequency signal received by each antenna channel in a group of antenna channels and shared by the group of antenna channels: converting, by an analog to digital converter, the multi-carrier analog intermediate-frequency signal into a multi-carrier digital intermediate-frequency signal, adjusting an amplitude and a phase of the multi-carrier digital intermediate-frequency signal, and then transmitting the adjusted multi-carrier digital intermediate-frequency signal to a combiner corresponding to the group of antenna channels; adding, by the combiner corresponding to the group of antenna channels, the adjusted multi-carrier digital intermediate-frequency signals corresponding to all the antenna channels in the group of antenna channels together to obtain a digital intermediate-frequency signal of a group of CAs; down-converting, by a digital down-conversion module, the digital intermediate-frequency signal of the group of CAs into baseband IQ data of the group of CAs, and transmitting the baseband IQ data of the group of CAs to a filter and decimation module; and processing, by the filter and decimation module, the baseband IQ data of the group of CAs to obtain baseband IQ data of each CA, and transmitting the baseband IQ data of each CA to an IR data interface module; and processing, by the IR data interface module, the baseband IQ data of each CA to obtain baseband IQ data of each CA, and transmitting the baseband IQ data of each CA to a BBU.

In an implementation, a quantity of antennas in the group of antennas is an exponent of 2.

The embodiment of the disclosure further provides an apparatus for transmitting data, the apparatus includes an IR data interface module, an interpolation and filter module, a digital up-conversion module, a combiner, an amplitude and phase adjustment module, and digital to analog converters. The IR data interface module is configured to process baseband IQ data of CAs to generate baseband IQ data of each groups of CAs. The interpolation and filter module is configured to increase a data rate of the baseband IQ data of each group of CAs. The digital up-conversion module is configured to up-convert the baseband IQ data of each group of CAs processed by the interpolation and filter module to a digital intermediate-frequency band. The combiner is configured to add digital intermediate-frequency signals of each group of CAs together to form a multi-carrier digital intermediate-frequency signal. The amplitude and phase adjustment module is configured to adjust an amplitude and a phase of the multi-carrier digital intermediate-frequency signal as required by each antenna in a group of antennas sharing the multi-carrier digital intermediate-frequency signal, and then transmit the adjusted multi-carrier digital intermediate-frequency signal to digital to analog converters of corresponding antenna channels. The digital to analog converters are configured to convert each adjusted multi-carrier digital intermediate-frequency signal into a CA analog intermediate-frequency signal, and transmit the CA analog intermediate-frequency signals to the corresponding antenna channels.

In an implementation, a quantity of antennas in the group of antennas is an exponent of 2.

In an implementation, the amplitudes and the phases required by the antennas are obtained from a BBU.

The embodiment of the disclosure further provides an apparatus for receiving data. The apparatus includes an analog to digital converter, an amplitude and phase adjustment module, a combiner, a digital down-conversion module, a filter and decimation module, and an IR data interface module. For a multi-carrier analog intermediate-frequency signal received by each antenna channel in a group of antenna channels and shared by the group of antenna channels: the analog to digital converter is configured to convert the multi-carrier analog intermediate-frequency signal into a multi-carrier digital intermediate-frequency signal; the amplitude and phase adjustment module is configured to adjust an amplitude and a phase of the multi-carrier digital intermediate-frequency signal, and transmit the adjusted multi-carrier digital intermediate-frequency signal to a combiner corresponding to the group of antenna channels; the combiner corresponding to the group of antenna channels is configured to add the adjusted multi-carrier digital intermediate-frequency signals corresponding to all the antenna channels in the group of antenna channels together to obtain a digital intermediate-frequency signal of a group of CAs; the digital down-conversion module is configured to down-convert the digital intermediate-frequency signal of the group of CAs to obtain baseband IQ data of the group of CAs; and the filter and decimation module is configured to process the baseband IQ data of the group of CAs to obtain baseband IQ data of each CA; and the IR data interface module is configured to process the baseband IQ data of each CA into baseband IQ data of each CA, and transmit the baseband IQ data of each CA to a BBU.

In an implementation, a quantity of antennas in the group of antennas is an exponent of 2.

The embodiment of the disclosure further provides an antenna array. The antenna array includes dually polarized antennas arranged in M rows by P columns, and antenna channels corresponding to the respective antennas. Both M and P are exponents of 2. The antenna array further includes an apparatus for transmitting data and/or an apparatus for receiving data according to the embodiment of the disclosure. The apparatus for transmitting data includes a transmitter, a processor, and a memory storing at least one instruction. The processor is configured to execute the at least one instruction to: process baseband IQ data of multiple CAs to generate baseband IQ data of each groups of CAs; increase a data rate of the baseband IQ data of each group of CAs; up-convert the baseband IQ data of each group of CAs to a digital intermediate-frequency band; add digital intermediate-frequency signals of each group of CAs together to form a multi-carrier digital intermediate-frequency signal; adjust an amplitude and a phase of the multi-carrier digital intermediate-frequency signal as required by each antenna in a group of antennas sharing the multi-carrier digital intermediate-frequency signal; convert each adjusted multi-carrier digital intermediate-frequency signal into a CA analog intermediate-frequency signal; and control the transmitter to transmit the CA analog intermediate-frequency signals to the corresponding antenna channels. The apparatus for receiving data includes a transmitter, a processor, and a memory storing at least one instruction. The processor is configured to execute the at least one instruction to: for a multi-carrier analog intermediate-frequency signal received by each antenna channel in a group of antenna channels and shared by the group of antenna channels: convert the multi-carrier analog intermediate-frequency signal into a multi-carrier digital intermediate-frequency signal; adjust an amplitude and a phase of the multi-carrier digital intermediate-frequency signal, add the adjusted multi-carrier digital intermediate-frequency signals corresponding to all the antenna channels in the group of antenna channels together to obtain a digital intermediate-frequency signal of a group of CAs; down-convert the digital intermediate-frequency signal of the group of CAs to obtain baseband IQ data of the group of CAs; and process the baseband IQ data of the group of CAs to obtain baseband IQ data of each CA. The processor is also configured to execute the at least one instruction to: process the baseband IQ data of each CA into baseband IQ data of each CA; and control the transmitter to transmit the baseband IQ data of each CA to a BBU.

DETAILED DESCRIPTION OF AN EMBODIMENT

An embodiment of the disclosure provides methods and apparatuses for transferring data, and an antenna array, so as to transmit data in a large bandwidth through a large-scale antenna array and meet the requirements of the future 5G system.

The embodiment of the disclosure provides a solution to supporting a large bandwidth by a large-scale antenna array when an IR interface bandwidth is specified. The large bandwidth as referred to is a bandwidth of higher than 40M, for example.

In a large-scale dually polarized antenna array consisting of M*P antennas, where M is an exponent of 2, and generally M is more than 4, for example, dually polarized antennas in four rows by one column including eight antennas in total are defined as a unit, then M*P/4 such units are needed in the dually polarized antenna array consisting of M*P antennas. Each unit can be connected with a BBU through two optic fibers of 10G each to transmit data of 16 CAs.

Figure 1:
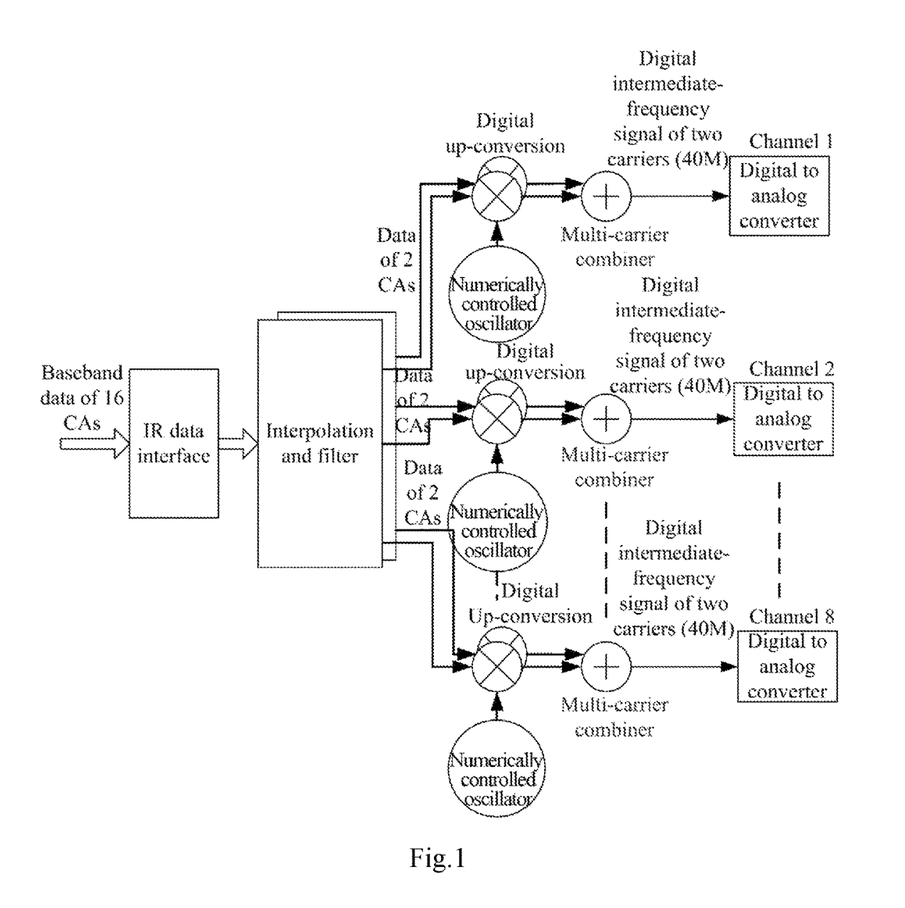
FIG. 1 is a schematic diagram of a digital intermediate-frequency implementation of a transmitting link of a large-scale antenna array with a narrow bandwidth according to the embodiment of the disclosure.
Figure 2:
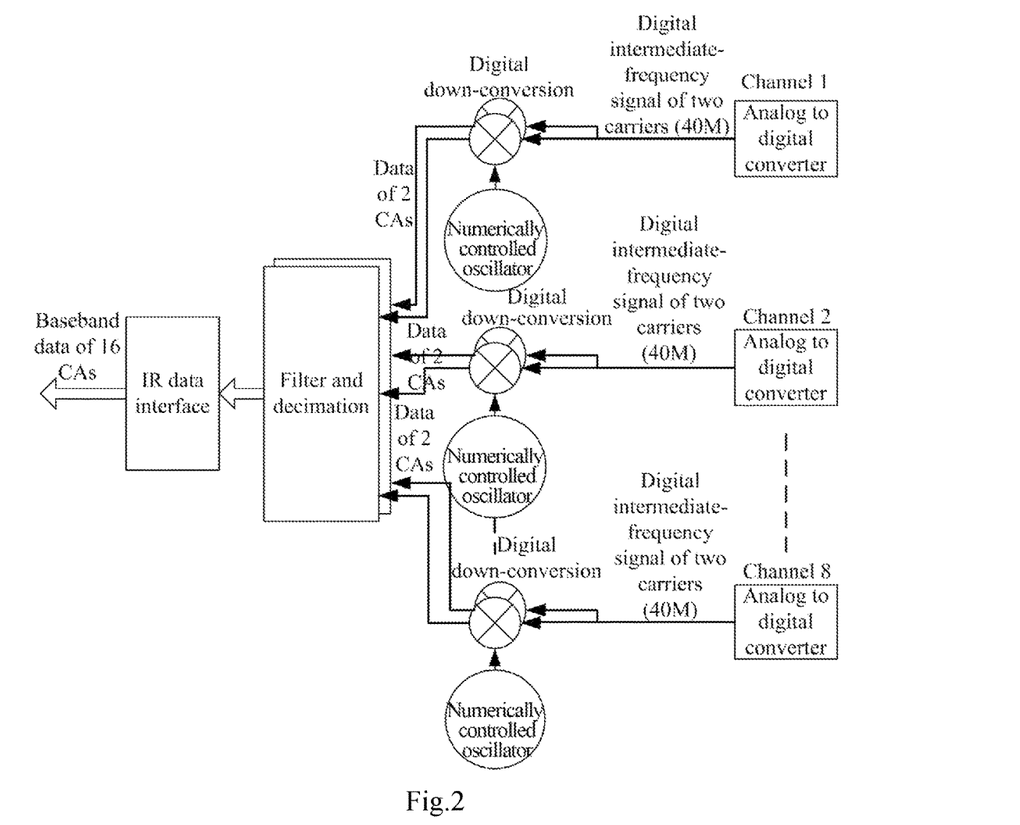
FIG. 2 is a schematic diagram of an implementation of a receiving link of the large-scale antenna array with a narrow bandwidth according to the embodiment of the disclosure.

Transmission and reception flows of complete antenna data in a bandwidth of less than 40M are illustrated by FIG. 1 and FIG. 2. All the antenna data is generated and adjusted by the BBU in a standard antenna array mode.

In the data transmission flow, data of 16 CAs transmitted by the BBU is separated by an IR data interface module into baseband IQ data of different CAs. The baseband IQ data of the different CAs are filtered and interpolated, so that data rates increase to be multiple times as much as a baseband IQ data rate. Furthermore the data is up-converted digitally into digital intermediate-frequency signals of the different CAs. Every two CAs are grouped together, thus resulting in eight groups in total. The digital intermediate-frequency signals of each group of CAs are summed up to obtain a digital intermediate-frequency signal of each group of CAs, and the digital intermediate-frequency signals are transmitted to digital to analog converters (DAC) to be converted into analog intermediate-frequency signals and then transmitted through corresponding antenna channels. There are eight channels for eight antennas to transmit the analog intermediate-frequency signals of the eight groups of CAs.

In the data reception flow, a CA analog intermediate-frequency signal transmitted from an analog to digital converter (ADC) is received by each receiving channel, and is down-converted digitally into data of different CAs. Each channel corresponds to data of a group of CAs including two CAs, and the data of each CA is decimated by the filter to form baseband IQ data, and the baseband IQ data is converted by an IR interface into baseband IQ data to be transmitted to the BBU for processing.

In this case, eight streams of data can be supported by eight antennas, and each stream of data includes data of two CAs.

Figure 3:
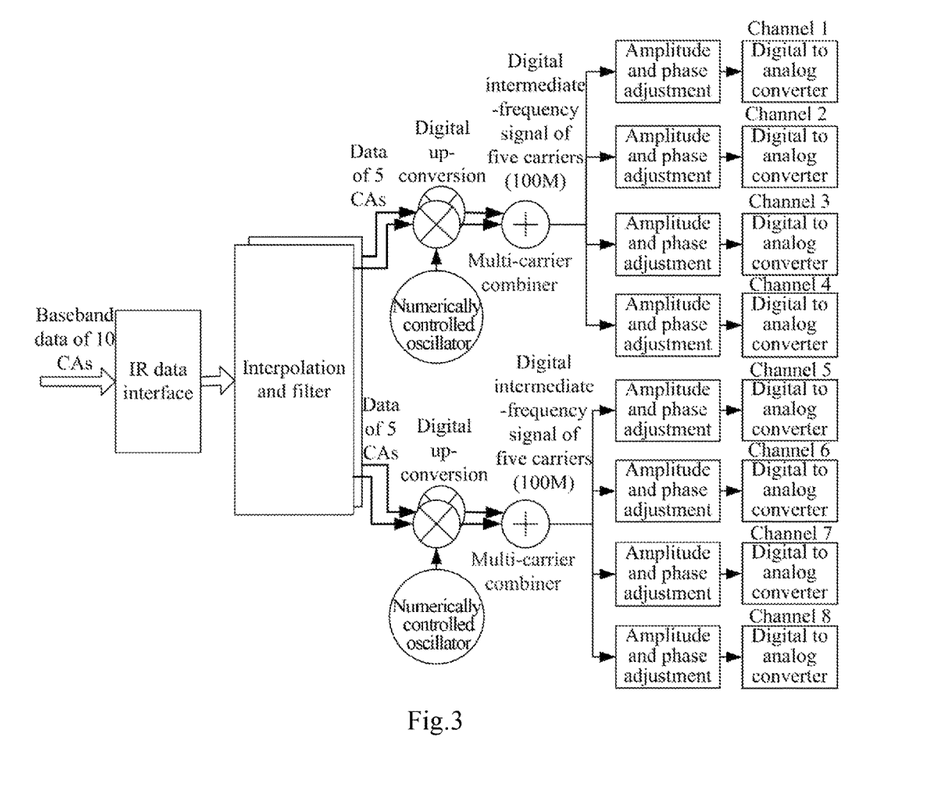
FIG. 3 is a schematic diagram of a digital intermediate-frequency implementation of a transmitting link of a large-scale antenna array with a large bandwidth according to the embodiment of the disclosure.
Figure 4:
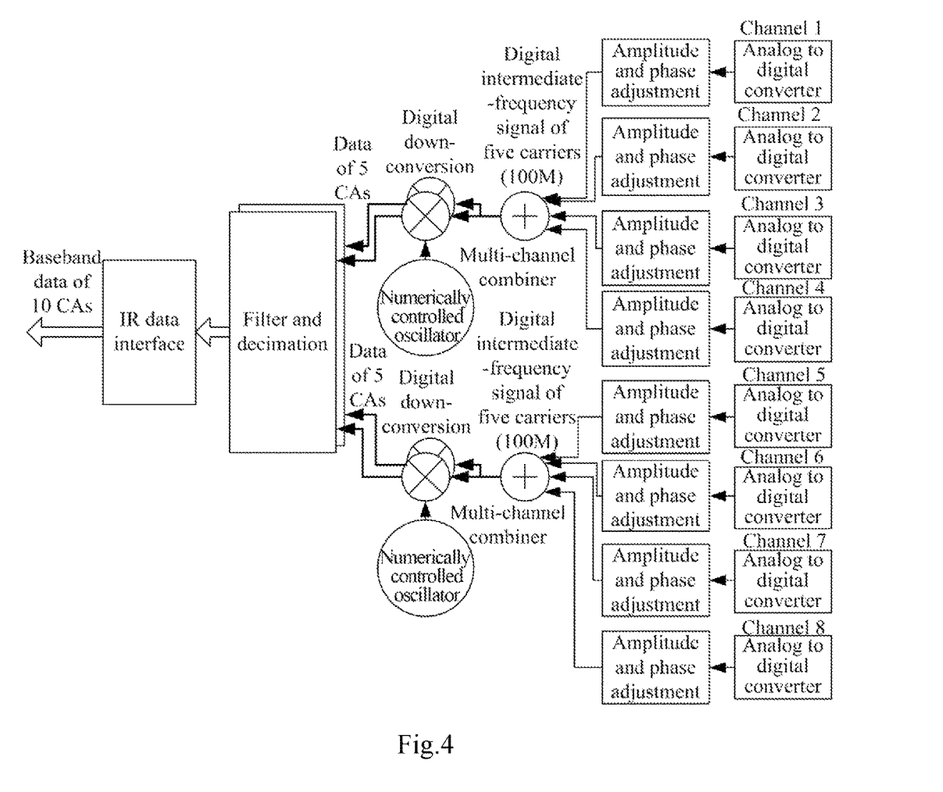
FIG. 4 is a schematic diagram of an implementation of a receiving link of the large-scale antenna array with a large bandwidth according to the embodiment of the disclosure.

In order to support a larger bandwidth, e.g., a bandwidth higher than 40M, since no more data can be transmitted via the IR interface, and the beam scanning range in the vertical direction is small, a set of baseband IQ data can be shared by every two or four antennas in the vertical direction, and a beam direction in a vertical direction can be attained by adjusting amplitudes and phases at digital intermediate frequencies in the antenna array, to achieve a corresponding antenna gain. Amplitude and phase adjustment parameters of each antenna in the vertical direction can be calculated by the BBU according to a desired beam angle in the vertical direction, and transmitted to an active antenna array. FIG. 3 and FIG. 4 illustrate this implementation, for example.

As illustrated by FIG. 3, in the flow of data transmission, every four of the eight antennas share a set of data, and each set includes data of five CAs. Each set of data is separated by an IR data interface module into data of different CAs and interpolated by a filter to obtain an appropriate data rate. Data of each carrier shared by a group of antennas is then up-converted into a digital intermediate-frequency band of the carrier, and added together to form a multi-carrier digital intermediate-frequency signal, i.e., a digital intermediate-frequency signal of five CAs with a total bandwidth of 100M to be transmitted through four antennas corresponding to four antenna channels. An amplitude and a phase of the digital intermediate-frequency signal is adjusted differently to be transmitted to DACs of different antenna channels, and the adjusted digital intermediate-frequency signals are converted into analog intermediate-frequency signals to be transmitted to corresponding analog antenna channels. The amplitudes and phases the antennas require are transmitted by the BBU. An analog intermediate-frequency signal of five CAs is transmitted by the channels 1 to 4, and another analog intermediate-frequency signal of five CAs is transmitted by the channels 5 to 8.

It shall be noted that FIG. 3 and FIG. 4 only illustrate data of two CAs included by each set of CA data and data of the other three CAs is omitted.

As illustrated by FIG. 4, in the flow of data reception, in a receiving link, signals of the respective antennas are sampled by ADCs into data, and the data is adjusted in amplitude and phase, and then summed up, so that the data from multiple channels is combined into respective groups of digital intermediate-frequency signals, where the channels 1 to 4 correspond to a group of digital intermediate-frequency signals, and the channels 5 to 8 correspond to another group of digital intermediate-frequency signals. Each group of digital intermediate-frequency signals is down-converted into data of the respective carriers, the data is decimated by the filter into baseband IQ data of the respective carriers, and the baseband IQ data is converted via the IR data interface into baseband IQ data of 10 CAs and is transmitted to the BBU for processing.

In this case, only two streams of data can be supported per eight antennas, and each stream of data includes data of 5 CAs.

If there is data of 16 CAs in total, then a set of data may be shared by two channels, so only four streams of data can be supported per eight antennas, and each stream of data includes data of 4 CAs.

Figure 5:
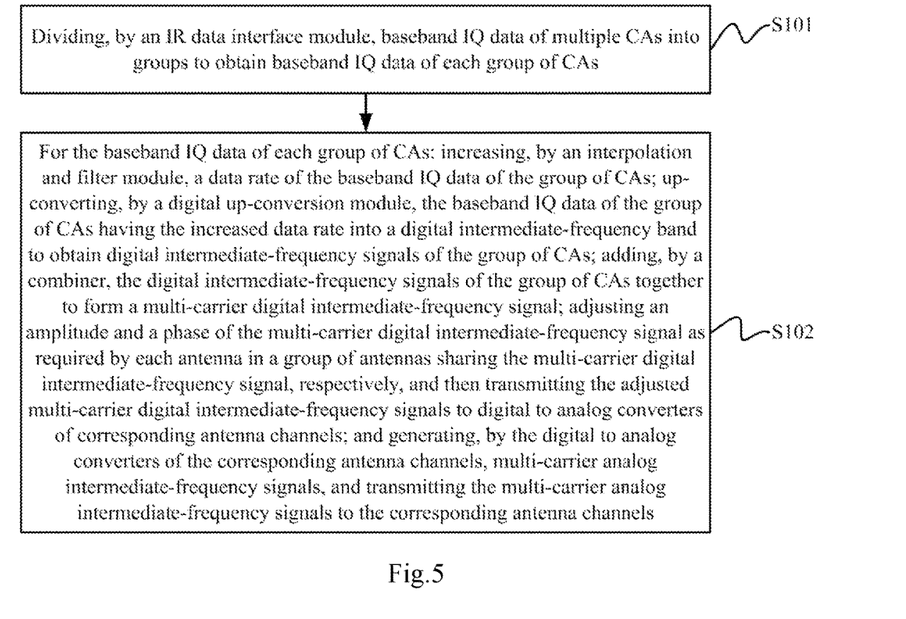
FIG. 5 is a schematic flow chart of a method for transmitting data according to the embodiment of the disclosure.

Then as illustrated by FIG. 5, a method for transmitting data according to the embodiment of the disclosure includes the following operations.

S101: dividing, by an IR data interface module, baseband IQ data of multiple CAs into groups to obtain baseband IQ data of each group of CAs.

S102: for the baseband IQ data of each group of CAs: increasing, by an interpolation and filter module, a data rate of the baseband IQ data of the group of CAs; up-converting, by a digital up-conversion module, the baseband IQ, data of the group of CAs having the increased data rate into a digital intermediate-frequency band to obtain digital intermediate-frequency signals of the group of CAs; adding, by a combiner, the digital intermediate-frequency signals of the group of CAs together to form a multi-carrier digital intermediate-frequency signal; adjusting, by an amplitude and phase adjustment module, an amplitude and a phase of the multi-carrier digital intermediate-frequency signal as required by each antenna in a group of antennas sharing the multi-carrier digital intermediate-frequency signal, respectively, and then transmitting the adjusted multi-carrier digital intermediate-frequency signals to digital to analog converters of corresponding antenna channels; and generating, by the digital to analog converters of the corresponding antenna channels, multi-carrier analog intermediate-frequency signals, and transmitting the multi-carrier analog intermediate-frequency signals to the corresponding antenna channels.

In an implementation, a quantity of antennas in the group of antennas is an exponent of 2.

In an implementation, the amplitudes and the phases required by the antennas are obtained from a BBU.

Figure 6:
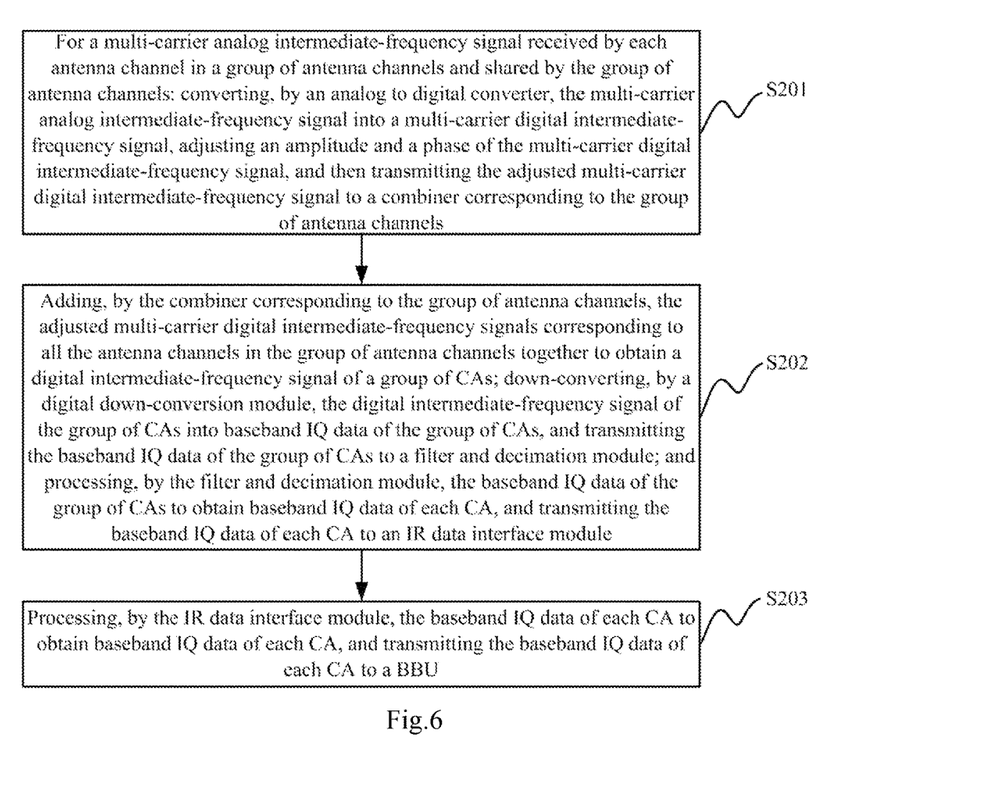
FIG. 6 is a schematic flow chart of a method for receiving data according to the embodiment of the disclosure.

As illustrated by FIG. 6, the embodiment of the disclosure provides a method for receiving data, and the method includes the following operations.

S201: for a multi-carrier analog intermediate-frequency signal received by each antenna channel in a group of antenna channels and shared by the group of antenna channels: converting, by an analog to digital converter, the multi-carrier analog intermediate-frequency signal into a multi-carrier digital intermediate-frequency signal, adjusting an amplitude and a phase of the multi-carrier digital intermediate-frequency signal, and then transmitting the adjusted multi-carrier digital intermediate-frequency signal to a combiner corresponding to the group of antenna channels.

S202: adding, by the combiner corresponding to the group of antenna channels, the adjusted multi-carrier digital intermediate-frequency signals corresponding to all the antenna channels in the group of antenna channels together to obtain a digital intermediate-frequency signal of a group of CAs; down-converting, by a digital down-conversion module, the digital intermediate-frequency signal of the group of CAs into baseband IQ data of the group of CAs, and transmitting the baseband IQ data of the group of CAs to a filter and decimation module; and processing, by the filter and decimation module, the baseband IQ data of the group of CAs to obtain baseband IQ data of each CA, and transmitting the baseband IQ data of each CA to an IR data interface module.

S203: processing, by the IR data interface module, the baseband IQ data of each CA to obtain baseband IQ data of each CA, and transmitting the baseband IQ data of each CA to a BBU.

In an implementation, a quantity of antennas in the group of antennas is an exponent of 2.

Figure 7:
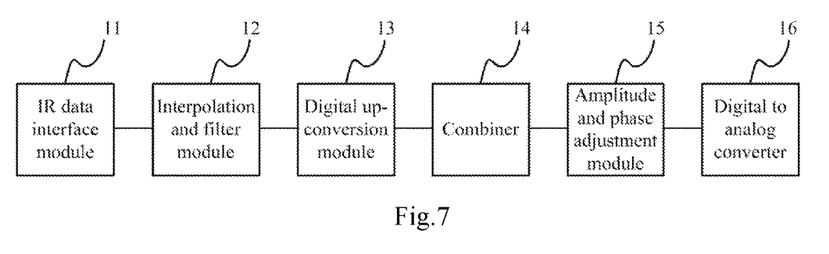
FIG. 7 is a schematic structural diagram of an apparatus for transmitting data according to the embodiment of the disclosure.

As illustrated by FIG. 7, the embodiment of the disclosure provides an apparatus for transmitting data. The apparatus includes an IR data interface module 11, an interpolation and filter module 12, a digital up-conversion module 13, a combiner 14, an amplitude and phase adjustment module 15, and digital to analog converters 16.

The IR data interface module 11 is configured to process baseband IQ data of CAs to generate baseband IQ data of each groups of CAs.

The interpolation and filter module 12 is configured to increase a data rate of the baseband IQ data of each group of CAs.

The digital up-conversion module 13 is configured to up-convert the baseband IQ data of each group of CAs processed by the interpolation and filter module 12 to a digital intermediate-frequency band.

The combiner 14 is configured to add digital intermediate-frequency signals of each group of CAs together to form a multi-carrier digital intermediate-frequency signal.

The amplitude and phase adjustment module 15 is configured to adjust an amplitude and a phase of the multi-carrier digital intermediate-frequency signal as required by each antenna in a group of antennas sharing the multi-carrier digital intermediate-frequency signal, and then transmit the adjusted multi-carrier digital intermediate-frequency signal to digital to analog converters 16 of corresponding antenna channels.

The digital to analog converters 16 are configured to convert each adjusted multi-carrier digital intermediate-frequency signal into a CA analog intermediate-frequency signal, and transmit the CA analog intermediate-frequency signals to the corresponding antenna channels.

In an implementation, a quantity of antennas in the group of antennas is an exponent of 2.

In an implementation, the amplitudes and the phases required by the antennas are obtained from a BBU.

Figure 8:
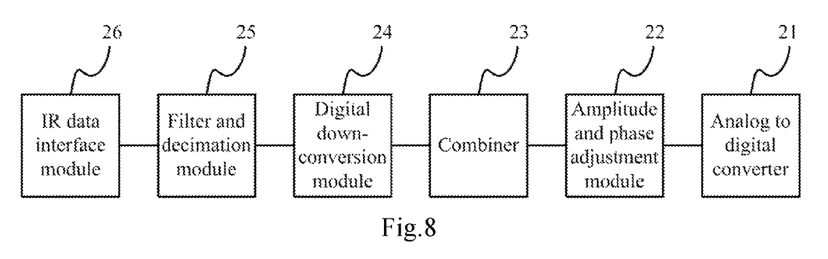
FIG. 8 is a schematic structural diagram of an apparatus for receiving data according to the embodiment of the disclosure.

As illustrated by FIG. 8, the embodiment of the disclosure further provides an apparatus for receiving data. The apparatus includes an analog to digital converter 21, an amplitude and phase adjustment module 22, a combiner 23, a digital down-conversion module 24, a filter and decimation module 25, and an IR data interface module 26.

For a multi-carrier analog intermediate-frequency signal received by each antenna channel in a group of antenna channels and shared by the group of antenna channels: the analog to digital converter 21 is configured to convert the multi-carrier analog intermediate-frequency signal into a multi-carrier digital intermediate-frequency signal; the amplitude and phase adjustment module 22 is configured to adjust an amplitude and a phase of the multi-carrier digital intermediate-frequency signal, and transmit the adjusted multi-carrier digital intermediate-frequency signal to a combiner 23 corresponding to the group of antenna channels; the combiner 23 corresponding to the group of antenna channels is configured to add the adjusted multi-carrier digital intermediate-frequency signals corresponding to all the antenna channels in the group of antenna channels together to obtain a digital intermediate-frequency signal of a group of CAs; the digital down-conversion module 24 is configured to down-convert the digital intermediate-frequency signal of the group of CAs to obtain baseband IQ data of the group of CAs; and the filter and decimation module 25 is configured to process the baseband IQ data of the group of CAs to obtain baseband IQ data of each CA.

The IR data interface module 26 is configured to process the baseband IQ data of each CA into baseband IQ data of each CA, and transmit the baseband IQ data of each CA to a BBU.

In an implementation, a quantity of antennas in the group of antennas is an exponent of 2.

The embodiment of the disclosure further provides an antenna array. The antenna array includes dually polarized antennas arranged in M rows by P columns, and antenna channels corresponding to the respective antennas. Both M and P are exponents of 2. The antenna array further includes the apparatus for transmitting data and/or the apparatus for receiving data according to the embodiment of the disclosure.

Moreover, it is noteworthy that the NCO in FIG. 1 to FIG. 4 represents a conventional numerically controlled oscillator, and each apparatus according to the embodiment of the disclosure can include this module. It can operate as in an existing technology, so a repeated description thereof is omitted here.

In summary, according to the embodiment of the disclosure, a large-scale antenna array can be configured so that beam forming of all its antennas can be implemented by a BBU, or phases of some of its antennas are fixed, according to different application scenarios to increase supported signal bandwidth without changing any physical hardware. In a case where a set of baseband IQ data is shared by a plurality of antennas, amplitude and phase adjustment parameters of all the antennas are calculated by the BBU according to a desired signal beam direction, and transmitted to the antenna array, so that beam forming of the antenna array is the same as the beam forming of the antenna array directly implemented by the BBU.

Those skilled in the art shall appreciate that the embodiment of the disclosure can be embodied as a method, a system or a computer program product. Therefore the disclosure can be embodied in a form of an all-hardware embodiment, an all-software embodiment or an embodiment of software and hardware in combination. Furthermore the disclosure can be embodied in the form of a computer program product in one or more computer useable storage mediums (including but not limited to a disk memory, a CD-ROM, an optical memory, and etc.) in which computer useable program codes are contained.

The disclosure is described with reference to flow charts and/or block diagrams of the methods, the apparatuses (systems) and the computer program product according to the embodiment of the disclosure. It shall be appreciated that each operation and/or block in the flow charts and/or block diagrams and combinations of the operations and/or the blocks in the flow charts and/or the block diagrams can be implemented by computer program instructions. These computer program instructions can be provided to a processor of a general-purpose computer, a specific-purpose computer, an embedded processor or another programmable data processing device to produce a machine so that the instructions executed by the processor of the computer or the other programmable data processing device create means for performing functions specified in the flow charts and/or the block diagrams.

These computer program instructions can also be stored into a computer readable memory capable of directing the computer or the other programmable data processing device to operate in a specific manner so that the instructions stored in the computer readable memory create an article of manufacture including an instruction means which performs functions specified in the flow charts and/or the block diagrams.

These computer program instructions can also be loaded onto the computer or the other programmable data processing device so that a series of operations are performed by the computer or the other programmable data processing device to create a computer implemented process so that the instructions executed by the computer or the other programmable device provide operations for performing the functions specified in the flow chart and/or the block diagrams.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

What is claimed is:

1. A method for transmitting data, the method comprising:
   dividing, by an interface radio frequency (IR) data interface module, baseband in-phase and quadrature (IQ) data of multiple carrier antennas (CAs) into groups to obtain baseband IQ data of each group of CAs; and
   for the baseband IQ data of each group of CAs: increasing, by an interpolation and filter module, a data rate of the baseband IQ data of the group of CAs; up-converting, by a digital up-conversion module, the baseband IQ data of the group of CAs having the increased data rate into a digital intermediate-frequency band to obtain digital intermediate-frequency signals of the group of CAs; adding, by a combiner, the digital intermediate-frequency signals of the group of CAs together to form a multi-carrier digital intermediate-frequency signal; adjusting, by an amplitude and phase adjustment module, an amplitude and a phase of the multi-carrier digital intermediate-frequency signal as required by each antenna in a group of antennas sharing the multi-carrier digital intermediate-frequency signal, respectively, and then transmitting the adjusted multi-carrier digital intermediate-frequency signals to digital to analog converters of corresponding antenna channels; and generating, by the digital to analog converters of the corresponding antenna channels, multi-carrier analog intermediate-frequency signals, and transmitting the multi-carrier analog intermediate-frequency signals to the corresponding antenna channels.

2. The method according to claim 1, wherein a quantity of antennas in the group of antennas is an exponent of 2.

3. The method according to claim 1, wherein the amplitudes and the phases required by the antennas are obtained from a baseband unit (BBU).

4. A method for receiving data, the method comprising:
for a multi-carrier analog intermediate-frequency signal received by each antenna channel in a group of antenna channels and shared by the group of antenna channels:
converting, by an analog to digital converter, the multi-carrier analog intermediate-frequency signal into a multi-carrier digital intermediate-frequency signal, adjusting an amplitude and a phase of the multi-carrier digital intermediate-frequency signal, and then transmitting the adjusted multi-carrier digital intermediate-frequency signal to a combiner corresponding to the group of antenna channels;
adding, by the combiner corresponding to the group of antenna channels, the adjusted multi-carrier digital intermediate-frequency signals corresponding to all the antenna channels in the group of antenna channels together to obtain a digital intermediate-frequency signal of a group of carrier antennas (CAs); down-converting, by a digital down-conversion module, the digital intermediate-frequency signal of the group of CAs into baseband in-phase and quadrature (IQ) data of the group of CAs, and transmitting the baseband IQ data of the group of CAs to a filter and decimation module; and processing, by the filter and decimation module, the baseband IQ data of the group of CAs to obtain baseband IQ data of each CA, and transmitting the baseband IQ data of each CA to an IR data interface module; and
processing, by the IR data interface module, the baseband IQ data of each CA to obtain baseband IQ data of each CA, and transmitting the baseband IQ data of each CA to a baseband unit (BBU).

5. The method according to claim 4, wherein a quantity of antennas in the group of antennas is an exponent of 2.

6. An antenna array, the antenna array comprising dually polarized antennas arranged in M rows by P columns, and antenna channels corresponding to the respective antennas, wherein both M and P are exponents of 2; and the antenna array further comprises an apparatus for transmitting data an apparatus for receiving data; wherein
the apparatus for transmitting data comprises a transmitter, a processor, and a memory storing at least one instruction, wherein the processor is configured to execute the at least one instruction to:

process baseband in-phase and quadrature (IQ) data of multiple carrier antennas (CAs) to generate baseband IQ data of each groups of CAs;
increase a data rate of the baseband IQ data of each group of CAs;
up-convert the baseband IQ data of each group of CAs to a digital intermediate-frequency band;
add digital intermediate-frequency signals of each group of CAs together to form a multi-carrier digital intermediate-frequency signal;
adjust an amplitude and a phase of the multi-carrier digital intermediate-frequency signal as required by each antenna in a group of antennas sharing the multi-carrier digital intermediate-frequency signal;
convert each adjusted multi-carrier digital intermediate-frequency signal into a CA analog intermediate-frequency signal;
control the transmitter to transmit the CA analog intermediate-frequency signals to the corresponding antenna channels; and
the apparatus for receiving data comprises a transmitter, a processor, and a memory storing at least one instruction, wherein the processor is configured to execute the at least one instruction to:
for a multi-carrier analog intermediate-frequency signal received by each antenna channel in a group of antenna channels and shared by the group of antenna channels: convert the multi-carrier analog intermediate-frequency signal into a multi-carrier digital intermediate-frequency signal; adjust an amplitude and a phase of the multi-carrier digital intermediate-frequency signal, add the adjusted multi-carrier digital intermediate-frequency signals corresponding to all the antenna channels in the group of antenna channels together to obtain a digital intermediate-frequency signal of a group of CAs; down-convert the digital intermediate-frequency signal of the group of CAs to obtain baseband IQ data of the group of CAs; and process the baseband IQ data of the group of CAs to obtain baseband IQ data of each CA; and
process the baseband IQ data of each CA into baseband IQ data of each CA; and control the transmitter to transmit the baseband IQ data of each CA to a BBU.

* * * * *